US011860664B2

United States Patent
Beneventi et al.

(10) Patent No.: US 11,860,664 B2
(45) Date of Patent: Jan. 2, 2024

(54) CONTROL APPARATUS FOR ACTUATING HYDRAULIC VALVE SYSTEMS

(71) Applicant: WALVOIL S.P.A., Reggio Emilia (IT)

(72) Inventors: Alessandro Beneventi, Reggio Emilia (IT); Alessandro Cervi, Reggio Emilia (IT); Matteo Gibellini, Reggio Emilia (IT)

(73) Assignee: WALVOIL S.P.A., Reggio Emilia (IT)

( * ) Notice: Subject to any disclaimer, the term of this patent is extended or adjusted under 35 U.S.C. 154(b) by 51 days.

(21) Appl. No.: 17/498,252

(22) Filed: Oct. 11, 2021

(65) Prior Publication Data

US 2022/0113754 A1 Apr. 14, 2022

(30) Foreign Application Priority Data

Oct. 9, 2020 (IT) .......................... 102020000023860

(51) Int. Cl.
*G05G 9/047* (2006.01)
*H01F 7/08* (2006.01)
*F16K 31/60* (2006.01)

(52) U.S. Cl.
CPC ............ *G05G 9/047* (2013.01); *F16K 31/60* (2013.01); *H01F 7/081* (2013.01); *G05G 2009/04751* (2013.01); *G05G 2009/04766* (2013.01); *G05G 2505/00* (2013.01)

(58) Field of Classification Search
CPC ......... G05G 9/047; G05G 2009/04751; G05G 2009/04766; G05G 2505/00; F16K 31/60; H01F 7/081
See application file for complete search history.

(56) References Cited

U.S. PATENT DOCUMENTS

| | | | |
|---|---|---|---|
| 5,168,221 A * | 12/1992 | Houston | G01B 7/003 324/207.13 |
| 5,576,704 A | 11/1996 | Baker et al. | |
| 6,002,184 A | 12/1999 | Delson et al. | |
| 6,468,158 B1 * | 10/2002 | Ootori | G05G 9/04785 463/37 |
| 11,079,294 B2 | 8/2021 | Kageyama et al. | |
| 2006/0169498 A1 | 8/2006 | Blanco | |
| 2008/0256941 A1 * | 10/2008 | Bertolasi | G05G 9/047 60/422 |
| 2013/0276925 A1 | 10/2013 | Merletti et al. | |

(Continued)

FOREIGN PATENT DOCUMENTS

| | | |
|---|---|---|
| EP | 3096197 A | 11/2016 |
| JP | 2000276244 A | 10/2000 |

(Continued)

*Primary Examiner* — Charles A Fox
*Assistant Examiner* — Gregory T Prather
(74) *Attorney, Agent, or Firm* — Carmel Patent Agency; Robert J. Ballarini (57) ABSTRACT

A control apparatus for actuating hydraulic valve systems includes an actuation section including an oscillating control element and a plurality of control rods provided with a pusher capable of interacting with the control element so as to translate the control rods in a longitudinal direction, a sensor section including a plurality of sensor elements for detecting a movement in a longitudinal direction of said control rods, and an auxiliary section capable of generating a force opposing the motion of the control rods.

14 Claims, 8 Drawing Sheets

(56) References Cited

U.S. PATENT DOCUMENTS

2014/0070123 A1\* 3/2014 Togashi .................. F16K 31/60
        251/129.03
2015/0345991 A1 12/2015 Kageyama et al.
2019/0250054 A1\* 8/2019 Kageyama ............. G05G 25/00

FOREIGN PATENT DOCUMENTS

| WO | 2008130870 A1 | 10/2008 |
|---|---|---|
| WO | 2015056595 A1 | 4/2015 |
| WO | 2018159330 A1 | 9/2018 |

\* cited by examiner

CONTROL APPARATUS FOR ACTUATING HYDRAULIC VALVE SYSTEMS

The present invention relates to a control apparatus for actuating hydraulic valve systems, of the type comprising an oscillating control element controlling a plurality of control rods whose movement is detected by means of corresponding sensors.

BACKGROUND

In the technical field of hydraulic drives, joystick-shaped control systems are commonly used, i.e., where a handle tiltable in different directions is used for the corresponding directional actuation of a hydraulically actuated component.

An example of such use is an operating machine, in which the joystick control is used to move the relative arm.

Possible examples of such joysticks are described in WO2018159330A1, US2006169498A1, US2013276925A1, WO2008130870A1, JP 2000 276244, U.S. Pat. No. 6,002,184, U.S. Pat. No. 5,576,704, WO 2015/05695 or EP 3096197.

In particular, JP 2000 276244 describes a joystick provided with a variable resistance damper. The damper is obtained by means of a cylinder in which there is an electroviscous fluid in which a piston can slide. By applying an electric field to the electroviscous fluid, it is possible to vary the damping effect obtained by the damper.

In some applications, a haptic interface may be required to provide tactile sensations in response to the movement of the joystick lever.

However, the known haptic devices make the joystick structure more complex and are therefore typically only used in high-end applications or in machines requiring complex drives.

However, it is desirable to make more compact solutions available which are better suited to the different requirements of specific applications.

SUMMARY

The technical problem underlying the present invention is that of providing a control apparatus, which allows an improvement of the known solutions and can at least partially overcome one or more of the identifiable disadvantages in relation to the prior art.

A further object of the present invention is to provide a control apparatus, which is more versatile and adaptable to specific needs.

It is also an object of the present invention to provide a control apparatus in which, despite the presence of a compact structure, the presence of the haptic device does not have a negative impact on the part dedicated to detecting the position of the lever.

A further object of the present invention is to provide a control apparatus in which the haptic perception function is present while adopting a structure which is on the whole analogous or at least similar to that of the apparatuses not having such a function.

Such a problem is solved and such objects are achieved by a control unit for actuating hydraulic valve systems comprising:

an actuation section which includes an oscillating control element around a hinging point and a plurality of control rods arranged around the hinging point and provided with a pusher capable of interacting with the control element following the oscillation thereof around the hinging point so as to make the control rods translate in the longitudinal direction;

a sensor section comprising a plurality of sensor elements preferably of a magnetic type to detect a movement in the longitudinal direction of said control rods; and an auxiliary section comprising a haptic device, capable of providing feedback to the user of the control apparatus as a function of the movement of the control element.

Preferably, the haptic device comprises at least one pair of ferromagnetic elements associated with a respective control rod, and configured to generate a magnetic field concatenated to the pair of magnetic elements so as to generate an attractive force between the two. Preferably, a winding is provided coaxial to the ferromagnetic elements to generate such a magnetic field.

Preferably, the winding is configured so that, following the passage of a current therethrough, the two ferromagnetic elements are subjected to a magnetic field of such intensity as to generate a resisting force capable of producing the required feedback during the movement of the oscillating control element. This allows the user to receive the feedback signal while operating the control apparatus.

The force generated will be such that the user will feel a resistance to the movement of the control rod.

The haptic device is advantageously configured to generate a resisting force, which opposes the movement of the control rod towards an insertion direction, by virtue of the force of attraction generated between the two elements.

It will be appreciated that it is thereby possible to provide a resisting force suitable for providing feedback perceptible to the user only when necessary depending on the operating conditions of the machine controlled by the control apparatus of the invention. In fact, the use of ferromagnetic elements associated with the coaxial winding through which a current is passed allows excluding or modulating, when necessary, the resisting force, which the user perceives on the control rod.

In addition, the present invention allows keeping the magnetic elements in a remote position with respect to the sensor elements, thus preventing them from being disturbed by the presence of the electromagnet, ensuring maximum efficiency for both the sensor section and the auxiliary section.

Furthermore, such a configuration allows to best exploit the longitudinal extension of the control rods to suitably position the haptic device without having an excessive impact on the overall dimensions of the structure.

In some designs, the auxiliary section comprises a first and second connection interface through which it can be connected to the actuation section and the sensor section, respectively.

The actuation section comprises a third connection interface through which it can be alternatively connected to the auxiliary section or to the sensor section so that the sensor section can be directly connected to the actuation section, detecting the longitudinal movement of the rods even if the auxiliary section is not present.

In another aspect, the actuation section, auxiliary section and sensor section comprise a respective casing.

By virtue of the presence of different sections and specific connection interfaces which allow the sections to be connected according to various configurations, it is possible to exploit a series of common components to obtain control apparatuses which include both the haptic function and in which this is not envisaged.

The use of three separate devices, housed in respective casings, allows components to be stored and assembled as required.

Thereby, a range of different control apparatuses can be provided to the user without the need for structural changes to the individual sections.

Preferably, the three sections are formed as separate bodies, so that the haptic section can be physically removed from the control apparatus, or simply not inserted during the assembly of the control apparatus, when there is no interest in using the auxiliary section.

In some designs, the first connection interface, the second connection interface and the third connection interface are configured so that a mechanical coupling is made between the actuation section, the auxiliary section and the sensor section.

According to a further aspect of the invention, the second connection interface, i.e., the one by which the auxiliary section connects to the actuation section, is identical to the third connection interface, i.e., the one by which the actuation section can alternatively be connected to the auxiliary section or to the sensor section. This allows for the adopting of an identical connection system between the various sections, benefiting the simplicity of the structure and making it easier to obtain.

In an embodiment, the auxiliary section comprises auxiliary rods integral or integratable with the control rods, the auxiliary rods comprising ends suitable for being detected by the sensor section. Such a feature allows the sensor section to be used indifferently to detect the movement of the control rods or the auxiliary rods if the auxiliary section comprising the haptic device is present.

Preferably, the auxiliary section comprises recesses in which the control rods can be received and the haptic device is placed at the recesses. Such an embodiment allows the auxiliary section to be made in a compact manner, making even greater use of the longitudinal extension of the control rods to appropriately position the haptic device.

According to yet another aspect of the invention, the control rods and/or auxiliary rods comprise a coupling element configured to engage the control rod to a corresponding auxiliary rod, making them integral in the longitudinal direction. Preferably, such a coupling element is located at opposite ends of the control rod and auxiliary rod, so that they can directly engage with each other as a result of the union between the actuation section and the auxiliary section.

In some designs, the control rods protrude from said actuation section and are shaped so that they can be inserted into respective holes defined in the sensor section, within which the sensors act to detect the movement in the longitudinal direction of the control rods. Such a feature simplifies the assembly of the control apparatus and minimises the number of components required to functionally connect the sections. Preferably, for the same purpose, the coupling element comprises a groove and a corresponding ring, made on one and the other of the control and auxiliary rods, respectively. According to a preferred embodiment, there is a cavity at one end, which is suitable to retain the end of the other.

In some designs, the auxiliary rods protrude from said auxiliary section and are shaped so as to be insertable inside the holes defined in said sensor section within which the control rods may also be inserted.

In some embodiments, the connecting interfaces comprise a shaped portion.

In another respect, the casings can be configured so as to define the shaped portion.

Preferred features of the invention are more generally defined in the dependent claims.

BREIF DESCRIPTION OF THE FIGURES

The features and advantages of the invention will become clearer from the detailed description of some of its embodiments illustrated, by way of non-limiting example, with reference to the accompanying drawings, wherein:

FIGS. 4A, 4B and 4C are perspective views, of which FIG. 4C is sectional, of respective actuation, auxiliary and sensor sections, representing details of the apparatus according to the present invention;

DETAILED DESCRIPTION OF PREFERRED EMBODIMENTS

Figure 1:
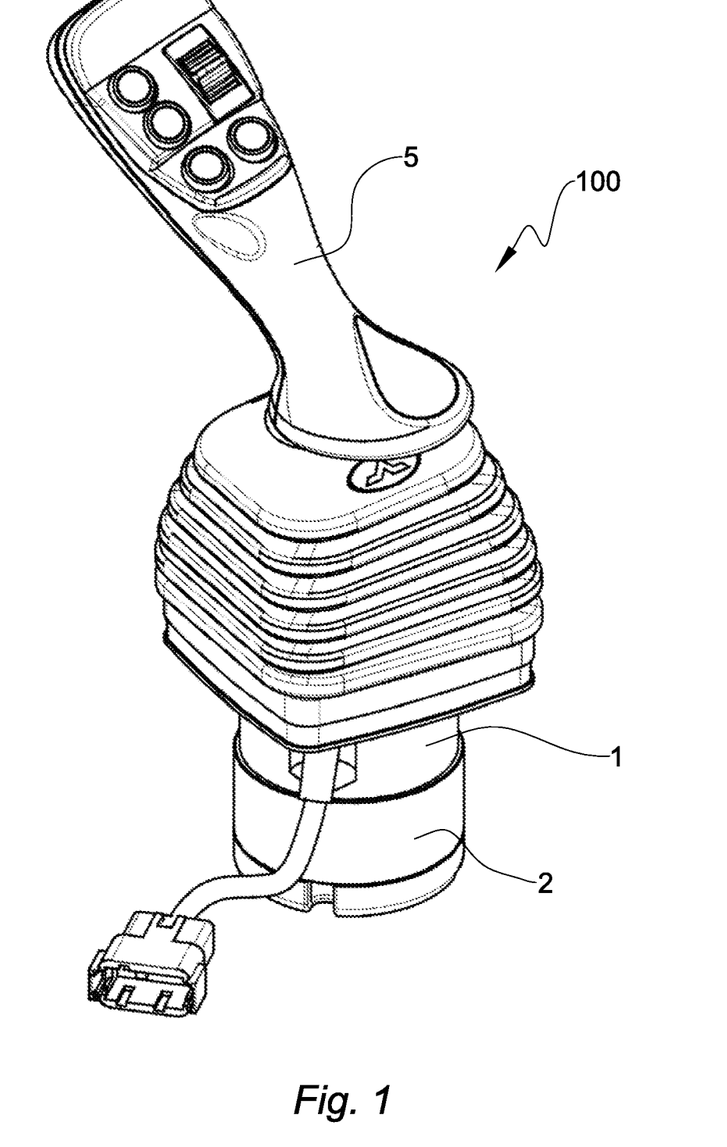
FIG. 1 is a perspective view of a control apparatus according to the present invention with a laterally inclined lever.
Figure 1A:
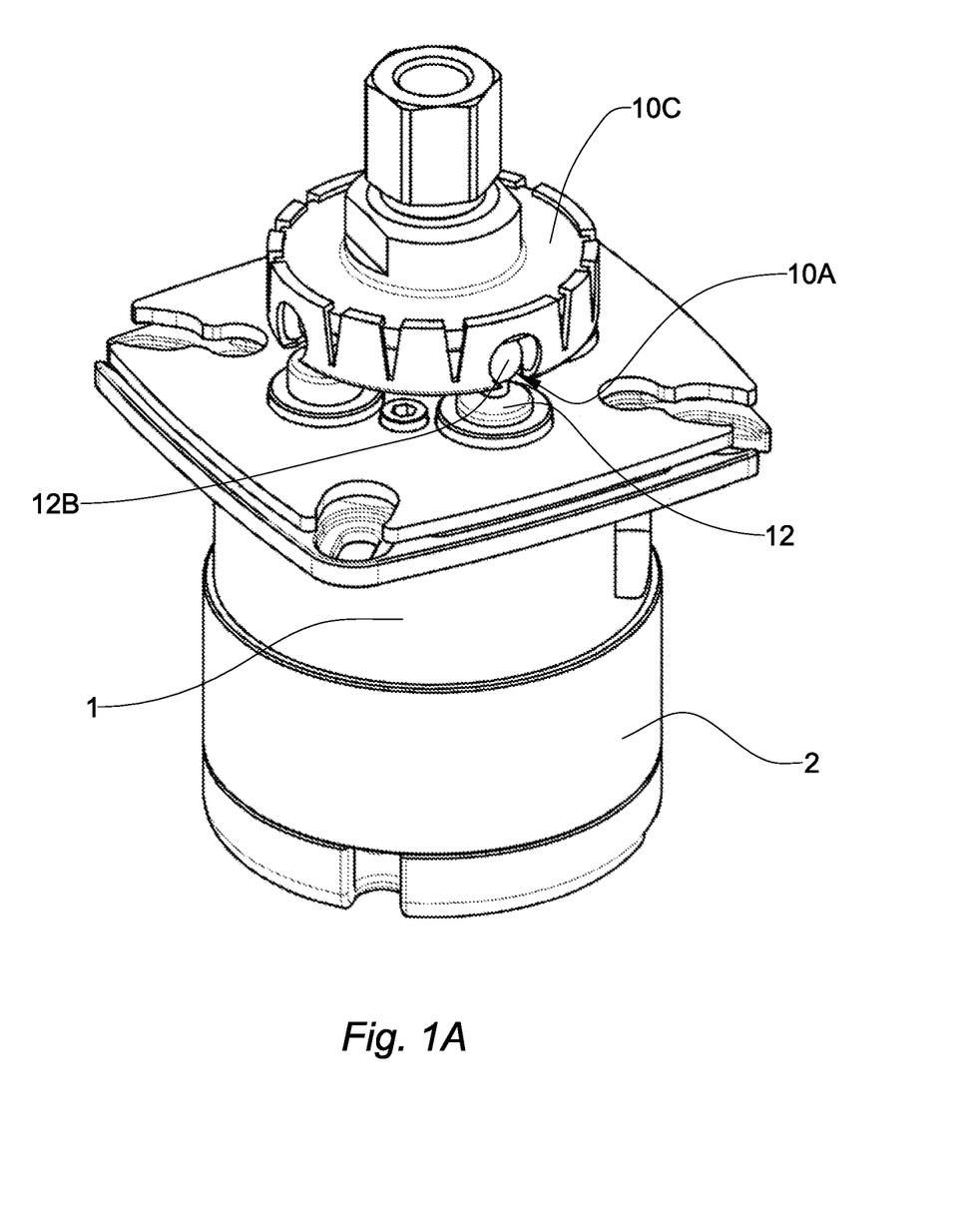
FIG. 1A is a perspective view from the control apparatus of FIG. 1 from which a lever and a cover sleeve have been removed for clarity of presentation.

With initial reference to FIG. 1, 100 is used as a whole to denote a control apparatus according to the present invention.

Preferably, the control apparatus according to the present invention finds preferred application in the construction of joysticks of the heavy duty type, therefore of the type typically intended for actuations in operating machines.

Figure 5:
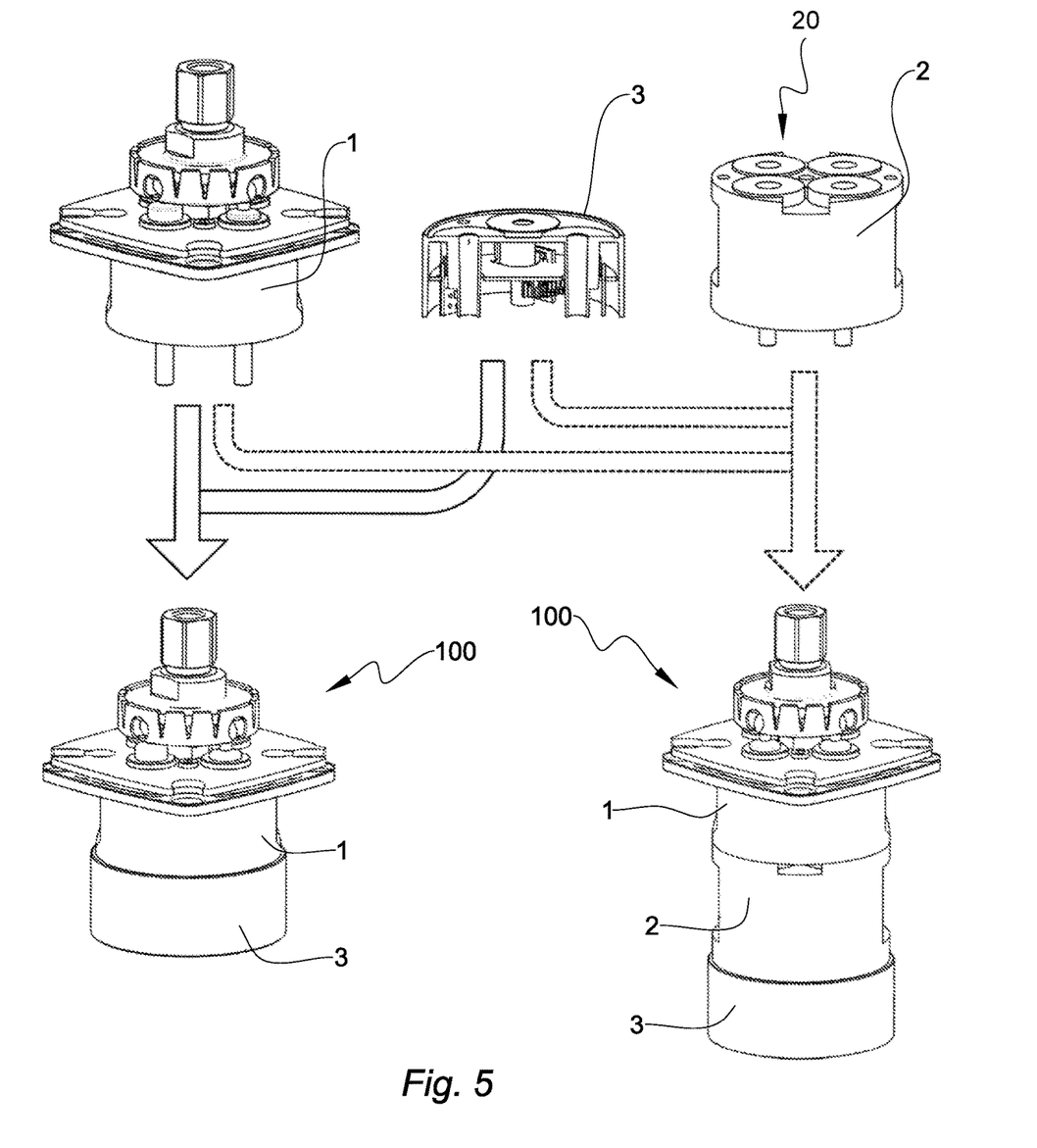
FIG. 5 is a schematic illustration, in perspective view, showing different modes of combining the sections depicted in FIGS. 4A, 4B and 4C.

As schematically illustrated in FIG. 5, the control apparatus 100 essentially consists of several sections which, in a preferred embodiment, can be assembled and stacked together in a package.

Figures 2, 2A:
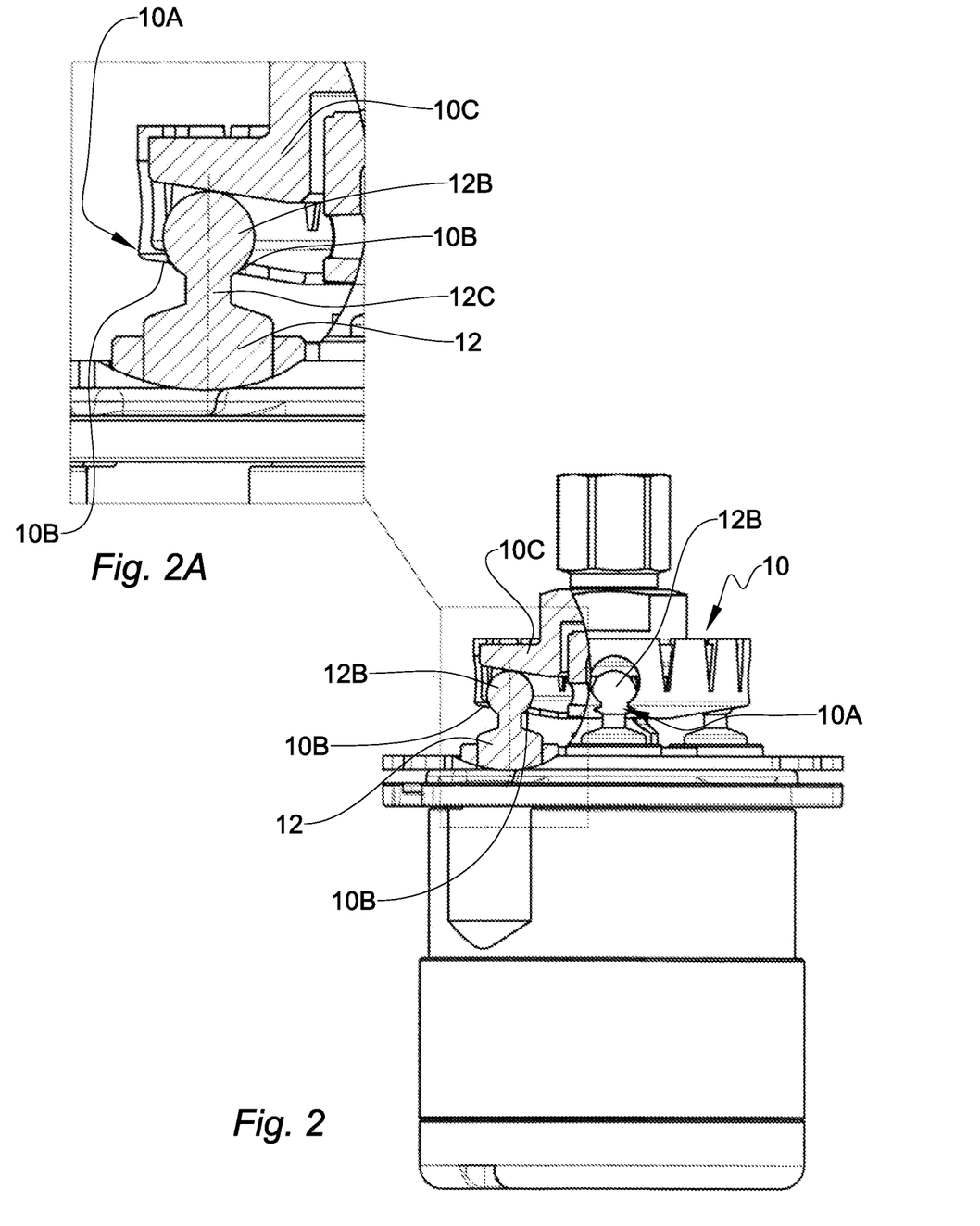
FIGS. 2 and 2A are a lateral section view and relative detail of the control apparatus of FIG. 1 in the rest position thereof, with some components omitted for illustrative clarity.

Referring now also to FIG. 2, the apparatus 100 comprises an actuation section 1 comprising an oscillating control element 10 around a hinging point O.

Preferably, the control element 10 is supported by means of a universal type joint, i.e., a joint formed by two perpendicular hinge axes which therefore allows the oscillation movement around a point described above.

In a preferred embodiment, a lever 5, shaped so that it can be grasped by a user, is connected to the control element 10, for example made in the form of a rigid shell, the features of which will be further explained below. Thereby, the lever 5 can be easily moved in order to oscillate the control element 10 into the required position.

The actuation section 1 further comprises a plurality of control rods 11 arranged around the hinging point O. Preferably, the rods 11 are provided with a pusher 12 capable of interacting with the control element 10 so as to make them translate in the longitudinal direction X.

In some embodiments, the control element 10 comprises coupling elements 10A, which allow the rods 11 to be constrained to the control element 10, causing them to translate in the longitudinal direction X as a result of the oscillation of the control element 10 itself.

The connection between the control element 10 and the pushers 12 is illustrated in an exemplary version in FIGS. 2 and 2A.

With reference to such figures, according to a preferred embodiment, the pushers 12 comprise heads 12B, which form an enlargement with respect to the rod portion 12C on which they are mounted.

The heads 12B are housed in respective housings, forming the coupling element 10A, through which the portion 12C can pass but not the head 12B as a whole. Thereby, a coupling can be made between the head 12B and a respective abutment surface 10B formed on the control element 10.

Based on other aspects, the control element 10 can further comprise a locking body 10C. Preferably, the locking body 10C can couple with a base portion of the control element 10, for example by snap fitting means, so as to pack the heads 12B between the abutment surface 10B and the locking body 10C.

The pushers 12, and consequently the rods 11, can follow the movement of the control element 10 in both directions along the longitudinal direction X in two opposite directions, i.e., both in extraction and in insertion with respect to the actuation section 1.

More generally, a bidirectional constraint between the rods 11 and the control element 10 can be envisaged in order to obtain a redundancy in the signal generated following the movement of the rods 11, as will be better illustrated below.

However, it will be appreciated that in some embodiments, the actuation section 1 can comprise a main elastic element, which stresses the rod 11.

In such a case, and generally as an alternative to the embodiment illustrated in the figures, the iteration between the pusher 12 of the rods 11 and the control element 10 can occur by simple contact, following contact with an abutment surface of the control element 10. In some of such variants, the coupling element 10A can be omitted, by virtue of the presence of the main spring element.

Preferably, in order to maintain the redundancy feature in the signal generated by the rod, it can be envisaged that the spring element keeps the pusher in contact with the control element even when the rod 11 is being extracted.

More generally, the redundancy can be obtained, in various embodiments, by envisaging the pushers 12 coupled to the control element 10 so that a movement in a first direction of a rod 11 results in a corresponding movement of the diametrically opposite rod with respect to the hinging point O in the opposite direction along the longitudinal direction X.

Figure 4A:
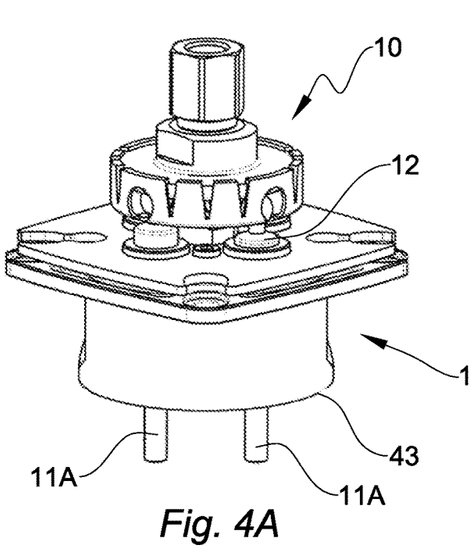

Referring now to FIG. 4A, the control rods 11 comprise a respective end section 11A protruding from the actuation section 1. In an embodiment, the end 11A, or more generally the rod, is shaped so as to be insertable inside a respective hole 31 defined in a sensor section 3.

Sensor elements 30 are present inside the sensor section 3 which are capable of detecting movement in the longitudinal direction of the control rods 11. By way of example, such sensors 30 can be of the Hall effect type, but it is understood that other types of sensors, whether mechanical or electromechanical, can also be envisaged.

The movement detected by the sensor elements 30 is then transmitted to the hydraulic system, in a manner known per se, to appropriately control the desired valve actuations.

The apparatus according to the present invention can further optionally comprise an auxiliary section 2 capable of providing feedback to the user of the control apparatus 100 as a function of the movement the oscillating control element.

For this purpose, the auxiliary section 2 comprises a special haptic device 20 which will be explained in more detail below. The auxiliary device is optional in the sense that it may or may not be included in the apparatus of the present invention based on specific needs. In other words, the auxiliary section 2 is advantageously configured as an autonomous section, which can be inserted between the actuation section 1, and the sensor section 3 according to specific requirements.

This is achieved by means of a suitable connection system between the sections, which allows to make the actuation section 1, auxiliary section 2 and sensor section 3 separate units, so that the auxiliary section 2 can be physically removed from the control apparatus, or not inserted in an assembly step of the control apparatus.

It will also be appreciated that advantageously the sections 2 and 3 are configured so that they do not impede the relative movement of the diametrically opposite rods 11.

Figure 3A:
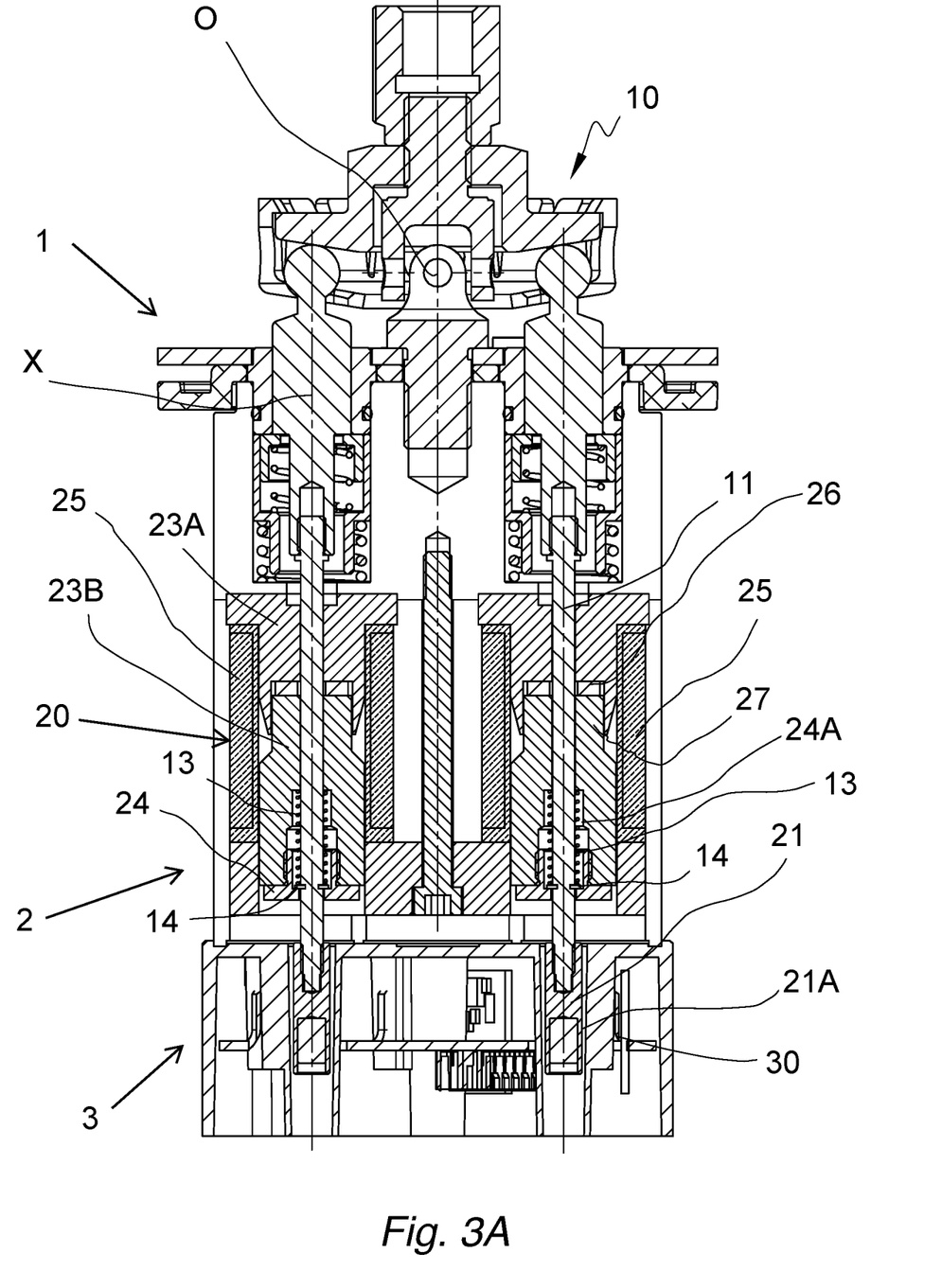
FIGS. 3A and 3B are two sectional lateral views of the control apparatus of FIG. 1 with the lever in rest position and in tilted position, respectively.
Figure 3B:
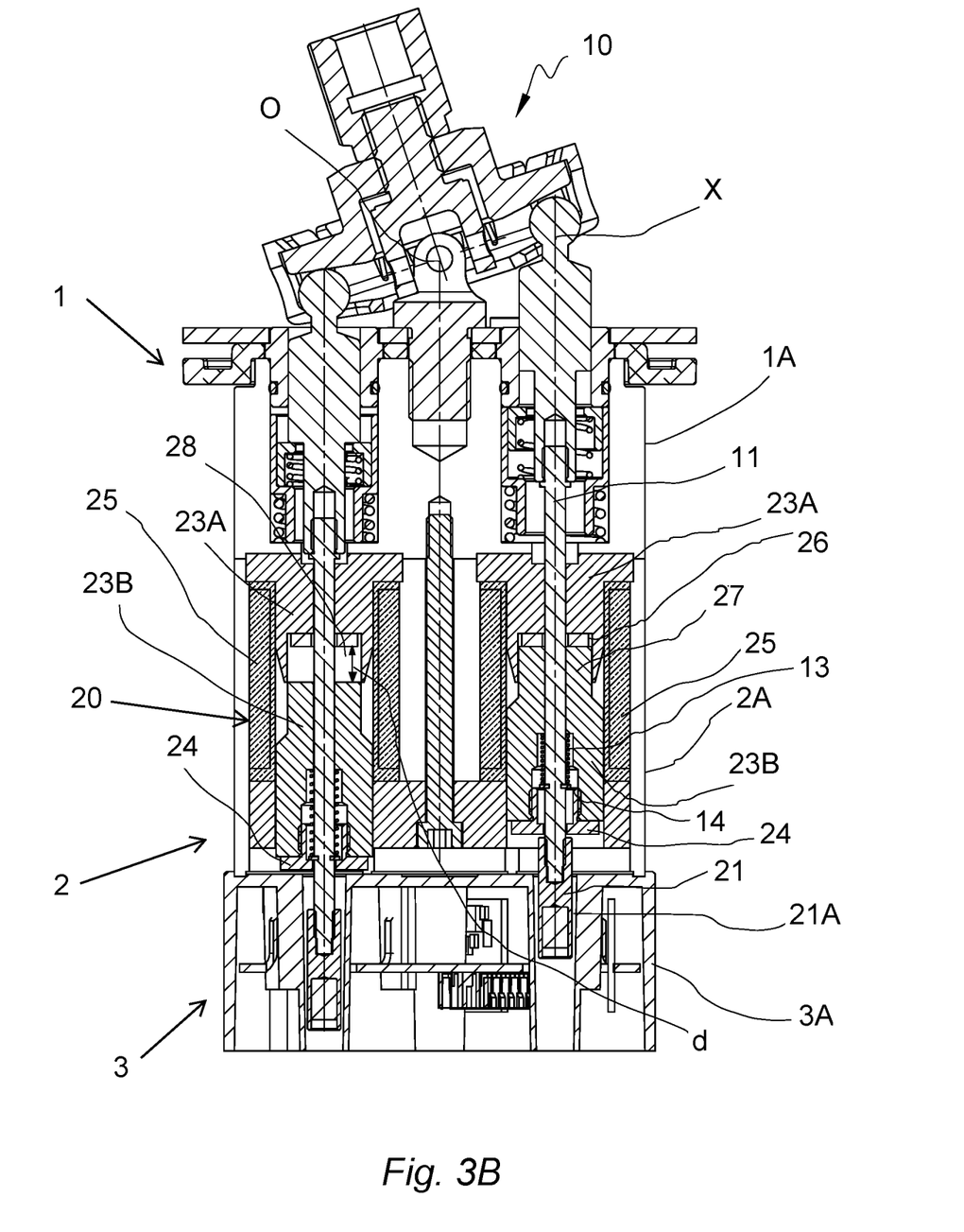

As illustrated in FIG. 3 and clarified by FIG. 5, the auxiliary section 2 preferably comprises a first connection interface 41 and a second connection interface 42 through which it can be connected to the actuation section 1 and the sensor section 3, respectively.

In turn, the actuation section 1 preferably comprises a third connection interface 43 through which it can alternatively be connected to the auxiliary section 2 or the sensor section 3.

According to a further aspect of the invention, the sensor section can in turn comprise a connection interface 44 which can alternatively be connected to the second or third interface, i.e. the actuation section or the auxiliary section.

In the light of the configuration described above, it is evident that the sensor section 3 can be directly connected to the actuation section 1, detecting the longitudinal movement of the control rods 11 even if the auxiliary section 2 is not present.

In fact, this allows for obtaining two different variants of the control apparatus of the present invention, without having to radically change the components used, thus making the equipment modular.

In some embodiments, the second connection interface 42 is identical to the third connection interface 43.

Preferably, the actuation 1, auxiliary 2 and sensor 3 sections comprise a respective casing 1A, 2A, 3A, as shown in FIG. 3B.

In some embodiments, the connection interfaces 41, 42, 43 can comprise a shaped portion of the casing.

The shaped portion can be defined by a shaped edge 2B of the section casing, which can be engaged in a counter-shaped groove 3B, as for example can be seen in FIG. 3B, at the connection interface between auxiliary section 2 and sensor section 3. However, it is clear that different embodiments of the shaped portion can also be envisaged, which can be formed by holes or seats in which to engage screws or pins or simply by a specific arrangement of the casing in order to allow assembly between the different sections, also through the use of further connection elements.

In an embodiment, the auxiliary section 2 can comprise auxiliary rods 21 which can be connected to the control rods 11 so as to make them integral along said longitudinal direction X.

In an embodiment, the auxiliary rods 21 also comprise ends 21A, preferably also provided with a further magnetic element, suitable to be detected by the sensor elements 30, by insertion thereof into the same holes used for the control rods 11. In other words, if the auxiliary section 21 is present, the ends 21A will be inserted into the holes 31 for the detection of the position thereof while, if this is not used, the ends 11A of the control rods 11 will be inserted into the holes 31.

Figure 4B:
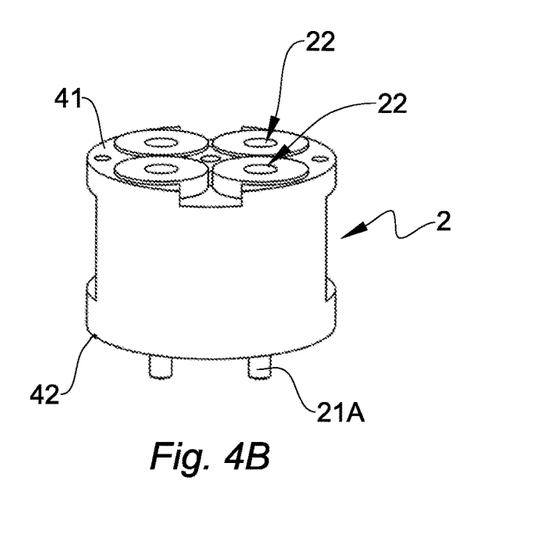
Figure 4C:
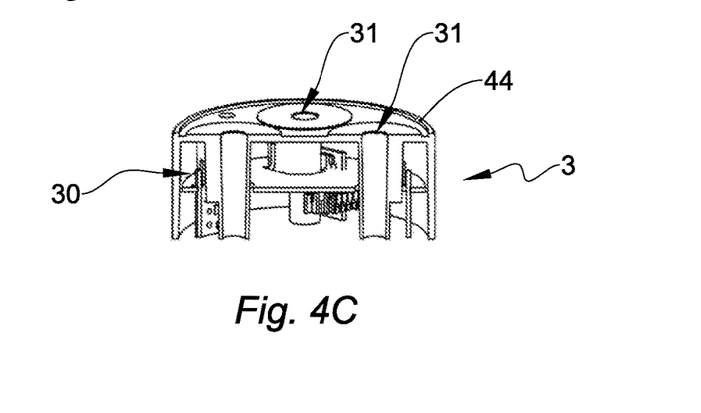

Referring now also to FIG. 4B, according to a preferred embodiment, the auxiliary section 2 comprises recesses 22 in which the control rods 11 can be received.

Referring now again to FIGS. 2 and 3A and 3B, an example of the implementation of the haptic device 20 will be described.

As can be seen from FIGS. 3A and 3B, the haptic device 20 is preferably located at the recesses 22 is configured to generate a resisting force opposing the movement of the control rod 11 and/or the auxiliary rods 21 towards an insertion extraction direction.

In some embodiments, the haptic device 20 comprises at least one pair of ferromagnetic material elements 23A and 23B associated with a respective control rod 11.

The two elements 23A, 23B preferably made from two blocks of ferromagnetic material, can be combined with an electrical winding 25 so that following the passage of a current I in the winding the two elements 23A and 23B are subject to the magnetic field generated thereby.

The two blocks are shaped so that they can be moved away from each other following the movement of the control element 10 and are separated by a non-magnetic washer 26.

In order to increase the stroke available for the movement of the ferromagnetic elements 23A and 23B, in some designs the elements 23A and 23B can be shaped so that they can penetrate each other. For this purpose, one can have a seat 28 and the other a corresponding portion 27 which is housable, at least partially, in said seat 28 as a result of the mutual approach between the two elements 23A, 23B.

Preferably, one element 23A is integral with the casing 2A of the auxiliary section 2 and the other element 23B engages on the rod 11 in the insertion direction thereof while it is disengaged in the extraction direction as visible in FIG. 3B.

In some embodiments, the rod 11 is slidingly constrained to said second ferromagnetic element 23B.

Preferably, an elastic element 13 coaxial to the rod 11 is envisaged which connects the rod to the second ferromagnetic element 23B. For this purpose, a first end of the elastic element 13 can abut against an abutment element 14 made in said rod 11, while a second end abuts against an abutment surface of the second ferromagnetic element 23B.

Thereby, the elastic element 13 is configured to be compressed as a result of an extraction movement of the rod 11.

Preferably, the abutment element 14 is rigidly connected to the rod 11 and configured so that it can engage from one side thereof on a plate 24 rigidly connected to the element 23B in order to drag it in translation together with the rod 11 in the insertion direction thereof. Conversely, when moving the rod 11 in the opposite direction, the abutment element 14 is not abutted by the plate 24, instead dragging the second ferromagnetic element 23B by means of the spring element 13 as illustrated above.

When a current I is introduced into the winding 25, a force proportional to the intensity of the current itself is generated, which attracts the element 23B to the element 23A, such a force is transmitted to the rod 11, for example through the plate 24 to the spring element 13 and then to the rod 11, opposing the motion in the insertion direction thereof.

Preferably, the locking element 11A of the rod 11 engages on the opposite side on an elastic element 24A of moderate stiffness.

Such an elastic element 24A compresses when the rod 11 is in translation in the extraction direction thereof, thus releasing the motion thereof from the element 23B, which thus remains in the rest position.

From what has been described, it is clear that the proposed configuration allows the simultaneous movement of the rods 11 in opposite directions and the generation of a force opposing the rod in the insertion direction, which force is transmitted directly to the operator of the control 10.

The intensity of the force generated is proportional to the intensity of the current I flowing in the winding 25 but is also a function of the distance between the ferromagnetic elements 23A and 23B.

Figure 6:
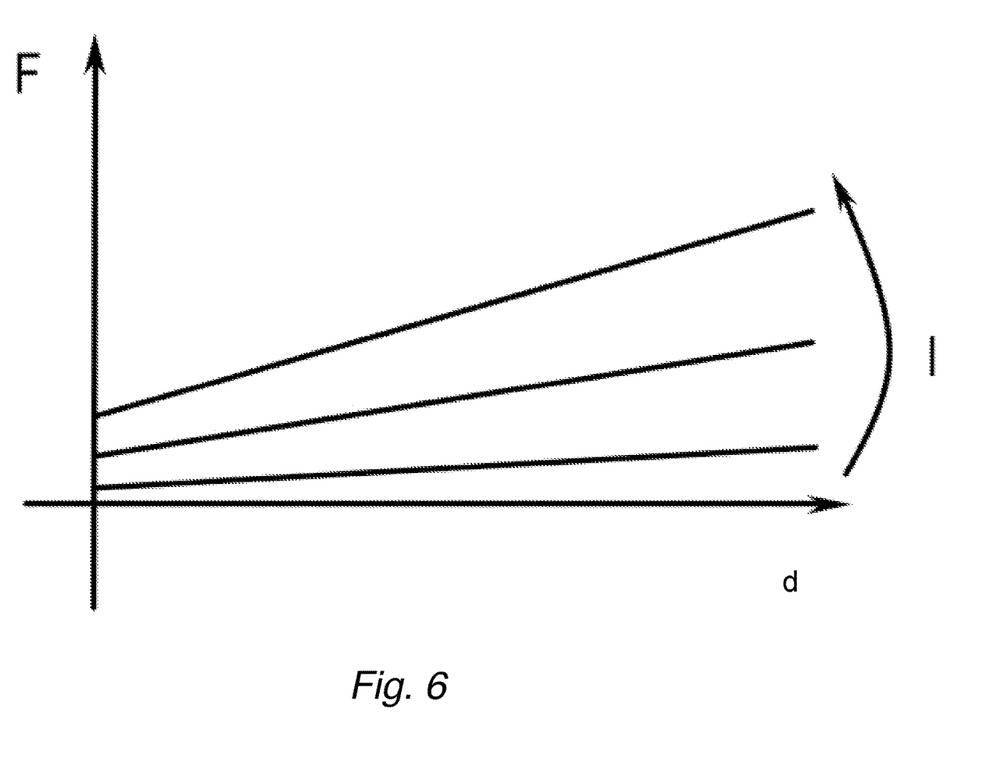
FIG. 6 is a graph showing the trend of the resisting force as a function of the movement of the control rods and the current applied to the haptic device windings.

In particular, with appropriate measures, it is possible to have a force which increases with the increase of the distance d between the ferromagnetic elements 23A and 23B as shown in FIG. 6, with such a measure the force generated has the same feature of a spring whose rigidity can be controlled through the intensity of the current.

These features allow to provide a haptic response to the user of the control apparatus 100 who will feel greater resistance to the tilting of the lever 5 as the deviation thereof from the central position increases, as a function of the intensity of the current applied to the winding 25.

Furthermore, it will be possible to provide different responses according to the different operating conditions, for example it will be possible to generate, by suddenly varying the current on the winding 25, a mechanical vibration on the control apparatus 100 in order to signal critical or dangerous conditions to the operator in a tactile manner. Or, for example, under particular conditions, such as approaching a limit work zone, it may be possible to operate the haptic device at higher currents so that the user recognises the approach of a limit situation.

The invention thus solves the proposed problem, while at the same time achieving a number of advantages, including the possibility of obtaining a modular control apparatus capable of operating with the same mechanical and electronic components both when it is necessary to include a haptic function and when this is not required.

The overall structure of the apparatus can also be easily adapted to different configurations as the connection interfaces make the sections easily interchangeable.

Furthermore, the configuration of the device makes it possible to keep the magnetic elements in a remote position from the sensor elements, thus preventing the latter from being disturbed by the presence thereof.

The invention claimed is:

1. A control apparatus for actuating hydraulic valve systems comprising:
   an actuation section which comprises an oscillating control element around a hinging point and a plurality of control rods arranged around the hinging point and provided with a pusher capable of interacting with the control element following the oscillation thereof around the hinging point so as to make the control rods translate in the longitudinal direction;
   a sensor section which comprises a plurality of sensor elements for detecting a movement in the longitudinal direction of said control rods;
   an auxiliary section comprising a haptic device, capable of providing the user of the control apparatus a feedback during the movement of the oscillating control element, the haptic device comprising at least one pair of ferromagnetic elements associated with a respective control rod and capable of mutual distancing movement following the movement of the control rod in an insertion direction; wherein said ferromagnetic elements are coaxial to an electric winding configured so that following the passage of a current in said winding the two elements are subjected to a magnetic field such as to generate a resisting force adapted to produce said feedback during the movement of the oscillating control element, wherein the auxiliary section is located in an intermediate position between the actuation section and the sensor section, each of said electric winding comprising opposite ends, said opposite ends comprising a first end facing the actuation section and a second end facing the sensor section, each control rod passing through both opposed ends of a respective electric winding, such that the ferromagnetic element can be extracted from the second end in order to modify a resisting force generated by the haptic device opposing the movement of the control rod towards said insertion direction, the control rods projecting from the second end of the respective electric winding so as to reach respective sensor elements of the sensor section.

2. The control apparatus according to claim 1, wherein the actuation section, the auxiliary section and the sensor section comprise a respective casing.

3. The control apparatus according to claim 2, wherein the force generated by the aforesaid magnetic field increases as a distance increases between the ferromagnetic elements.

4. The control apparatus according to claim 2, wherein a first ferromagnetic element of said pair is integral with the casing of the auxiliary section and a second ferromagnetic element of said pair is connected to the rod so as to be able to be dragged in translation together with the rod in the insertion direction thereof.

5. The control apparatus according to claim 4, further comprising an elastic element coaxial to the rod, a first end of the elastic element being abutted against an abutment element of said rod and a second end being abutted against an abutment surface of said second ferromagnetic element, said elastic element being configured so as to be compressed following an extraction movement of the rod.

6. The control apparatus according to claim 4, wherein said rod is slidingly constrained to said second ferromagnetic element.

7. The control apparatus according to claim 1, wherein said haptic section, based on a position of the rod measured by said sensor section, supplies, varying a current on the winding, a variable force which opposes the movement of the same rod as a function of the movement of the oscillating control element.

8. The control apparatus according to claim 1, wherein said ferromagnetic elements and said winding are configured so that said resisting force increases with the increase of a distance between said ferromagnetic elements.

9. The control apparatus according to claim 1, wherein said ferromagnetic elements and said winding are configured so that by introducing a current in said winding a resisting force, proportional to the intensity of the current, is generated which attracts said element to said element.

10. The control apparatus according to claim 1, wherein said ferromagnetic elements are shaped so that they can penetrate one another.

11. A control apparatus, for actuating hydraulic valve systems comprising:
   an actuation section which includes an oscillating control element around a hinging point and a plurality of control rods arranged around the hinging point and provided with a pusher capable of interacting with the control element following the oscillation thereof around the hinging point so as to make the control rods translate in the longitudinal direction;
   a sensor section which includes a plurality of sensor elements for detecting a movement in the longitudinal direction of said control rods;
   an auxiliary section comprising a haptic device, capable of providing the user of the control apparatus a feedback during the movement of the oscillating control element, the haptic device comprising at least one pair of ferromagnetic elements associated with a respective control rod and capable of mutual distancing movement following the movement of the control rod in an insertion direction; wherein said ferromagnetic elements are coaxial to an electric winding configured so that following the passage of a current in said winding the two elements are subjected to a magnetic field such as to generate a resisting force adapted to produce said feedback during the movement of the oscillating control element, wherein the auxiliary section is configured to be located in an intermediate position between the actuation section and the sensor section, each of said electric winding comprising opposite ends, said opposite ends comprising a first end facing the actuation section and a second end facing the sensor section, each control rod passing through both opposed ends of a respective electric winding, such that the ferromagnetic element can be extracted from the second end in order to modify a resisting force generated by the haptic device opposing the movement of the control rod towards said insertion direction, the control rods projecting from the second end of the respective electric winding so as to reach respective sensor elements of the sensor section, and wherein said auxiliary section comprises a first and a second connection interface through which it can be connected respectively to the actuation section and to the sensor section and wherein said actuation section comprises a third connection interface through which it can be alternatively connected to the auxiliary section or to the sensor section such that the sensor section can be directly connected to the actuation section, detecting longitudinal movement of the control rods even if the third connection interface is not connected to the auxiliary section.

12. The control apparatus according to claim 11, wherein said first connection interface, second connection interface and third connection interface are configured so as to obtain a mechanical coupling between the actuation section, the auxiliary section and the sensor section.

13. The control apparatus according to claim 12, wherein said second connection interface is identical to said third connection interface.

14. The control apparatus according to claim 11, wherein the connection interfaces comprise a shaped portion.

* * * * *